United States Patent Office 2,792,388
Patented May 14, 1957

2,792,388

PROCESS FOR PREPARING N-MONOACYLATED GLUCOSAMINE

Hans W. Ruelius, Philadelphia, Pa., assignor to American Home Products Corporation, New York, N. Y., a corporation of Delaware No Drawing. Application November 4, 1953, Serial No. 390,241

5 Claims. (Cl. 260—211)

This invention relates to a new and improved process for the preparation of N-monoacyl-hexosamines from hexosamine hydrohalides. More particularly, it relates to a new and improved process for the preparation of N-monoacetyl-glucosamine and N-monopropionyl-glucosamine from D-glucosamine hydrochloride.

Previously in preparing N-monoacyl hexosamines from hexosamine salts, and especially in preparing N-monoacetyl-glucosamine from D-glocosamine hydrochloride, the usual procedure has required the use of silver acetate as a reactant. Silver acetate is of course expensive, and the necessity of using it greatly increased the cost of the resulting N-acylated hexosamine product.

I have now found that it is possible to produce N-monoacyl-hexosamines directly from salts of hexosamines, as, for example, the D-glucosamine hydrohalides, by reacting a hexosamine hydrohalide, such as D-glucosamine hydrochloride, with an acylating agent, the process being carried out in the presence of a secondary or tertiary amine base in a reaction medium comprising a lower alkanol such as methanol, ethanol, or isopropanol. As the acylating agent I prefer to use an organic acid anhydride such as acetic anhydride or propionic anhydride.

The organic base present in the reaction medium, preferably a secondary or tertiary amine base, is one capable of forming a hydrohalide which is soluble, at least to an appreciable extent, in the alcohol. Diethylamine and triethylamine are especially suitable.

In carrying out the reaction, the hexosamine hydrohalide may be suspended in the alcohol, and the organic base and acylating agent, in excess, then added thereto. Agitation of the reaction mixture results in the N-monoacylated-hexosamine, which, in the case of N-monoacetyl glucosamine and N-monopropionyl glucosamine, is substantially insoluble in the alcohol and is precipitated in the reaction medium. The hydrohalide of the secondary or tertiary amine base, being soluble in the alcohol, is readily removed from the N-acylated hexosamine product.

The yields are generally very high, and will ordinarily amount to at least seventy percent of the theoretical. It is generally advisable to use as the reaction medium alcohol which does not contain too large a percentage of water, in order to secure the highest yields of product. Ordinarily alcohol of 90 percent to 95 percent concentration will give satisfactory yields, especially when methanol or ethanol is employed. Substantially anhydrous alcohol, such as substantially anhydrous methanol, is especially satisfactory as the reaction medium, resulting in yields of N-monoacyl-hexosamine product are especially high. The reaction will proceed satisfactorily at room temperature. However, the time required for completion can be shortened by the use of elevated temperatures, such as those up to the boiling point of the lower aliphatic alcohol which constitutes the medium in which the reaction is carried out.

As examples of my improved process, the following may be regarded as illustrative. The specific amounts, proportions and conditions set forth are of course to be regarded merely as examples, and not necessarily as restrictive.

*Example 1*

To a suspension of 80 grams of D-glucosamine hydrochloride in 1 liter of substantially anhydrous methanol, there was added 53 ml. of triethylamine and 60 ml. of acetic anhydride. The mixture was vigorously agitated for 2 hours. A further amount of 12 ml. of acetic anhydride was then added to the reaction mixture and agitation continued for an additional period of about three and one-half hours.

The solid material present in the reaction mixture was then filtered off, with suction, and washed with methanol until a sample of the wash liquid was free from chloride ion. The product was then dried. The product was substantially pure N-acetyl-d-glucosamine which had an optical rotation identical with that reported in the literature. The yield of product was over 80 percent.

*Example 2*

To a suspension of 80.0 grams of D-glucosamine hydrochloride in 1 liter of 95% ethanol, there was added 53.0 ml. of triethylamine and 60.0 ml. of acetic anhydride. The mixture was vigorously agitated for 2 hours at room temperature. An additional 12 ml. of acetic anhydride was then added. The reaction mixture was then refluxed, with stirring, for a period of about one hour.

After cooling, the solid material present in the reaction mixture was filtered off, with suction, and washed with 95% ethanol until a sample of the wash liquid was free from chloride ion. The product was then dried. The yield of substantially pure N-acetyl-d-glucosamine was over 80 percent of the theoretical.

*Example 3*

To a suspension of 40.0 grams of D-glucosamine hydrochloride in 500 ml. of substantially anhydrous methanol, there was added 23.5 ml. of diethylamine and 30 ml. of acetic anhydride. The mixture was vigorously agitated for 2 hours. A further amount of 12.0 ml. of acetic anhydride was then added to the reaction mixture, and agitation continued for an additional period of 3 hours. After this time additional acetic anhydride in the amount of 12.0 ml. was added, and agitation continued for about 3 hours.

The solid material present in the reaction mixture was filtered off, with suction, and washed with methanol. The product was then dried. The yield of substantially pure N-acetyl-d-glucosamine was approximately 60 percent of the theoretical.

*Example 4*

To a suspension of 40.0 grams of D-glucosamine hydrochloride in 500 ml. of substantially anhydrous methanol, there was added 27 ml. of triethylamine and 48 ml. of propionic anhydride. The mixture was vigorously agitated for 2 hours. An additional 9.5 ml. of propionic anhydride was then added to the reaction mixture, and agitation continued for a further period of three and one-half hours.

The solid material present in the reaction mixture was filtered off, with suction, and washed with methanol until the wash liquid was free from chloride ion. The product was then dried. It was substantially pure N-propionyl-d-glucosamine, and it had an optical rotation of $+38.9°$ (end value in water). Elemental analyses gave values for carbon, hydrogen and nitrogen which agreed with the theoretical values for N-propionyl-d-glucosamine.

The above description and examples are intended to be primarily illustrative. Any modification of, or variation therefrom, which conforms to the spirit of the invention

I claim:

1. The process of preparing an N-monoacylated glucosamine which comprises reacting a D-glucosamine hydrohalide, an organic base selected from the group consisting of secondary and tertiary amines forming alcohol-soluble hydrohalides, and an acylating agent selected from the group which consists of acetic anhydride and propionic anhydride, said reaction being carried out in a reaction medium comprising a lower aliphatic alcohol in which said hydrohalide of said organic base is soluble and said N-monoacylated glucosamine insoluble.

2. The process of producing an N-monoacyl-glucosamine which comprises reacting a glucosamine hydrohalide with an acylating agent selected from the group which consists of acetic anhydride and propionic anhydride, and an organic base selected from the group consisting of diethylamine and triethylamine, said reaction being carried out in a lower aliphatic alcohol in which said N-monoacyl glucosamine is insoluble but in which the hydrohalide of said organic base is soluble.

3. The process of producing an N-monoacyl-glucosamine which comprises reacting a glucosamine hydrohalide with an acylating agent selected from the group which consists of acetic anhydride and propionic anhydride, and an organic base selected from the group which consists of diethylamine and triethylamine, said reaction being carried out in a reaction medium comprising a lower aliphatic alcohol selected from the group which consists of methanol, ethanol and isopropanol.

4. The process of preparing N-monoacetyl-d-glucosamine which comprises reacting a D-glucosamine hydrohalide, an organic base forming an alcohol-soluble hydrohalide, and acetic anhydride, said reaction being carried out in a reaction medium comprising a lower aliphatic alcohol in which said hydrohalide of said organic base is soluble and said N-monoacetyl-d-glucosamine insoluble.

5. The process of preparing N-monopropionyl-d-glucosamine which comprises reacting a D-glucosamine hydrohalide, an organic base forming an alcohol-soluble hydrohalide, and propionic anhydride, said reaction being carried out in a reaction medium comprising a lower aliphatic alcohol in which said hydrohalide of said organic base is soluble and said N-monopropionyl-d-glucosamine insoluble.

References Cited in the file of this patent

UNITED STATES PATENTS 2,463,885    Kuehl et al. _____ Mar. 8, 1949